US006957182B1

(12) United States Patent
Turnbull et al.

(10) Patent No.: US 6,957,182 B1
(45) Date of Patent: Oct. 18, 2005

(54) AUDIO CODER UTILIZING REPEATED TRANSMISSION OF PACKET PORTION

(75) Inventors: Rory Stewart Turnbull, Ipswich (GB); Andrew Gordon Davis, Woodbridge (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/763,466

(22) PCT Filed: Sep. 14, 1999

(86) PCT No.: PCT/GB99/03043

§ 371 (c)(1),
(2), (4) Date: Feb. 23, 2001

(87) PCT Pub. No.: WO00/18057

PCT Pub. Date: Mar. 30, 2000

(30) Foreign Application Priority Data

Sep. 22, 1998 (GB) .................................. 9820655

(51) Int. Cl.[7] .......................................... G10L 19/02
(52) U.S. Cl. ...................... 704/229; 375/267; 375/240
(58) Field of Search ........................... 704/206, 200.1, 704/208, 203, 500, 229; 348/468; 382/250; 395/2.39

(56) References Cited

U.S. PATENT DOCUMENTS

| 5,692,102 | A | * | 11/1997 | Pan ............................. 704/230 |
| 5,850,419 | A | * | 12/1998 | Todoroki .................... 375/267 |
| 5,956,674 | A | * | 9/1999 | Smyth et al. ............. 704/200.1 |
| 6,111,916 | A | * | 8/2000 | Talluri et al. ........... 375/240.23 |
| 6,122,338 | A | * | 9/2000 | Yamauchi .................... 375/377 |

FOREIGN PATENT DOCUMENTS

| DE | 197 13 059 A | 11/1997 |
| EP | 0 533 538 A | 8/1993 |
| WO | WO 95 06368 | 3/1995 |

OTHER PUBLICATIONS

Bolot et al, "Control Mechanisms for Packet Audio in the Internet", Proceedings of IEEE Infocom 1966, Conference on Computer Communications, Fifteenth Annual Joint Conference of the IEEE Computer and Communications Societies, Networking the Next Generation, San Francisco, Mar. 24-28, 1996, vol. 1, No. CONF. 15, pp. 232-239, XP000622315.

Hardman et al, "Reliable Audio for Use Over the Internet", Proceedings of Inet '95, Jun. 1995, pp. 27-30.

* cited by examiner

*Primary Examiner*—David L. Ometz
*Assistant Examiner*—Jakieda R Jackson
(74) *Attorney, Agent, or Firm*—Nixon & Vanderhye P.C.

(57) ABSTRACT

A coder generates a first output providing first data from which a decoder can produce a reconstructed signal and a second output providing second, enhancement, data whereby a decoder receiving both the first and second data can produce a higher quality reconstructed signal. Packets of data are assembled for transmission, each packet containing primary data which includes the first data in respect of a temporal portion of the signal and the second data in respect of the same portion of the signal and secondary data which includes the first data in respect of a different temporal portion of the signal.

23 Claims, 6 Drawing Sheets

といった、the test.

AUDIO CODER UTILIZING REPEATED TRANSMISSION OF PACKET PORTION

BACKGROUND OF THE INVENTION

The present invention is concerned with the transmission of signals in discrete packets, and is especially concerned with the sending of audio signals, though it is also applicable to other kinds of signal, for example video signals. More particularly it is concerned with the transmission of digitally coded audio signals in which information about successive frames of the audio signals is sent in successive discrete packets of a transmitted signal, which are then used by a receiver to create a replica of the original signal (for the purposes of discussion it will be assumed that there is a one-to-one correspondence between audio frames and transmission packets, though this is not actually essential). The invention seeks to address problems that arise when the transmitted information is lost or corrupted, so that one (or more) of the packets is unavailable to the receiver. Losses of this kind can occur in many types of transmission system, due for example to noise or (in a radio system) fading. In some types of system—for example connectionless services such as the Internet—different packets may be transmitted over different paths, and therefore be subject to different delays which can be so great as to result in the packets arriving in a different order from the order in which they were transmitted. Conventionally this is allowed for by providing the receiver with a buffer which introduces a delay: the receiver stores the received packets in the buffer, and if the packets are numbered at the transmitter the receiver can then read the packets out of the buffer in the original sequence. For many applications this delay must be kept reasonably short if the overall transmission delay is not to be excessive, and the possibility remains that a packet may suffer a delay in excess of the buffer delay period. In such a case the packet is effectively lost, as the receiver is unable to make use of it. It has also been proposed (see, for example J. Bolot and A. Garcia, "Control Mechanisms for Packet Audio in the Internet", Proceedings of IEEE INFOCOM'96, Conference on Computer Communications, March 1996, pp 232–9 and V. Hardman, M. Sasse, M. Handley and A. Watson, "Reliable Audio for use over the Internet", Proceedings of INET '95, June 1995, pp 27–30. to provide redundancy in the signal, where each packet carries not only data pertaining to a frame of the audio signal but also data in respect of the previous frame of the audio signal, coded using a lower bit-rate coding algorithm, so that if a single frame is lost, this redundant data from the following frame can be decoded and used to fill in the gap that would otherwise occur in the decoded audio signal. However this process can be complex, and can give rise to difficulty due to discontinuous decoder operation, resulting in distortion.

BRIEF SUMMARY OF EXEMPLARY EMBODIMENTS

According to one aspect of the present invention there is provided an apparatus for transmission of signals comprising:

(a) a coder operable to generate a first output providing first data from which a decoder can produce a reconstructed signal and a second output providing second, enhancement, data whereby a decoder receiving both the first and second data can produce a higher quality reconstructed signal; and (b) means operable to assemble packets of data for transmission, each packet containing:
primary data which includes the first data in respect of a temporal portion of the signal and the second data in respect of the same portion of the signal; and
secondary data which includes the first data in respect of a different temporal portion of the signal but lacks the second data in respect of that portion.

The said different temporal portion may be a portion later than that represented by the primary data, for example the portion directly following the portion represented by the primary data, or can be a portion earlier than that represented by the primary data. Preferably the assembly means is arranged to include in each packet a sequence code to indicate the temporal sequence of the primary data contained in the packets. In a preferred arrangement, the coder is operable to produce a plurality of outputs providing enhancement data, successive sets of enhancement data representing successive improvements to the reconstructed signal quality, the primary data includes all such outputs and the secondary data includes first data in respect of a like plurality of different temporal portions of the signal and progressively smaller numbers of sets of second data in respect of those portions.

The signals may be audio signals, the coder being an audio signal coder, for example a sub-band coder in which the first data include data in respect of lower frequency ones of the coder sub-bands, and the second, enhancement data include data in respect of higher frequency sub-bands.

Whether or not a sub-band coder is used, the first data may include binary representations of digital values and the second data include additional bits representing a finer resolution of the said digital values.

A particularly preferred sub-band coder suitable for use in the transmission apparatus (though it also has other uses) comprises:

(a) filter means to receive a sampled audio signal and to divide the signal into a plurality of sub-band signals each corresponding to a respective frequency sub-band;
(b) a quantiser for quantising the sub-band signals;
(c) bit allocation means for adaptively determining the number of quantisation levels to be used by the quantiser in dependence on the signal characteristics;
and wherein the quantiser has a first output for providing said first data, said first data comprising quantised values for one or more of said sub-bands, and a second output for providing said second data, said second data comprising, for at least one of the sub-bands in respect of which quantised values are provided at the first output, additional, enhancement, bits representing a less coarse quantisation of the values for that sub-band or sub-bands, and that the bit allocation means is operable to perform a first allocation operation in which a first predetermined quota of bits for the first output is allocated among the sub-bands followed by a second allocation operation in which a second predetermined quota of bits, for the additional bits at the second output, is allocated among the sub-bands.

If desired, the second output may also provide quantised values for at least one sub-band in respect of which quantised values are not provided at the first output. In a preferred arrangement, the quantiser has at least one further output, and the second and further output(s) in each case provide values for sub-bands not represented in any lower-order output and/or provide additional bits for sub-bands which are represented in a lower order output, the bit allocation means being operable to perform a number of allocation operations equal in number to the number of outputs, each serving to allocate, for that output, a respective quota of bits among the sub-bands.

In a further aspect of the invention, there is provided an apparatus for reception of signals comprising:

a) means for receiving packets of data, each packet containing
   primary data which includes first data in respect of a temporal portion of the signal and second, enhancement, data in respect of the same portion of the signal; and
   secondary data which includes the first data in respect of a different temporal portion of the signal;
(b) a buffer for storing the received packets;
(c) a decoder capable of producing a reconstructed signal from the first data alone and capable of a producing a higher quality reconstructed signal from the first and second data together;
(d) control means operable to read from the buffer the primary data in respect of successive temporal portions of the signal and to forward them to the decoder; and, in the event that the primary data in respect of a temporal portion of speech be absent from the buffer, to read instead the secondary data in respect of that temporal portion and forward it to the decoder.

Preferably the control means is operable, in said event that the secondary data in respect of a temporal portion of speech be absent from the buffer, to read the second, enhancement, data in respect of a different temporal portion of the speech signal and forward it to the decoder.

If each packet contains a sequence code to indicate the temporal sequence of the primary data contained in it, the control means can be arranged to determine the temporal sequence of the packets by reference to the sequence code, irrespective of the actual order of receipt of the packets.

BRIEF DESCRIPTION OF DRAWINGS

Some embodiments of the invention will now be described, by way of example, with reference to the accompanying drawings, in which.

DETAILED DESCRIPTION OF EXEMPLARY EMBODIMENTS

Figure 1:
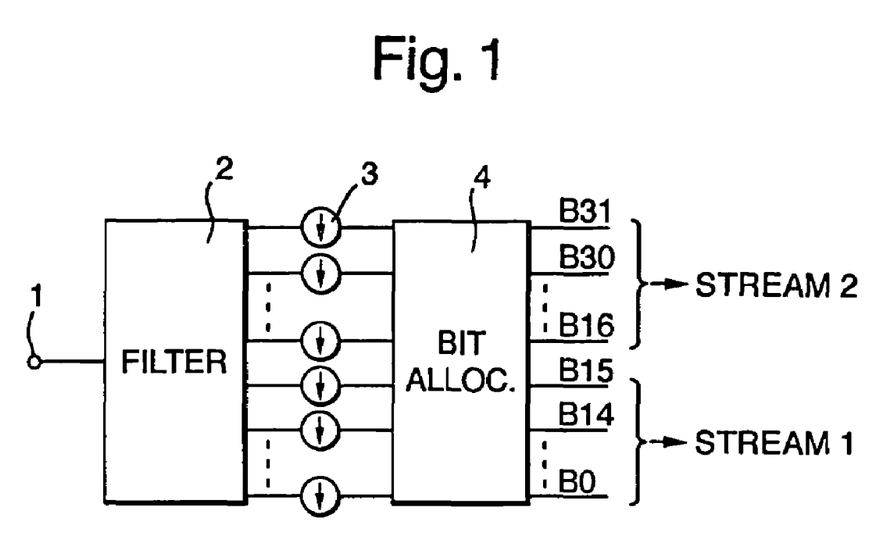
FIG. 1 is a block diagram of a sub-band speech coder used in a first embodiment of the invention.

FIG. 1 shows a simple sub-band speech coder which is used in a first embodiment of the present invention. An input audio signal is received, in the form of a sequence of digital samples, at an input 1. Typically this might be at a sampling rate of 16 kHz, with 16 bits per sample. It is divided by a filter bank 2 into thirty-two sub-bands each of bandwidth 250 Hz. Thus the lowest sub-band covers the range 0–250 Hz and the highest covers the range 7.75–8 kHz. Each sub-band is then subsampled at 3 to a sampling rate of 500 Hz.

The rationale of sub-band coding is that the relative importance of the different sub-bands to the overall quality of the decoded audio signal is different, and that therefore compression can be achieved by allocating to each sub-band only as many bits per sample as its perceptual significance justifies. In this coder, the allocation of bits to sub-bands is fixed, so that for example the lowest sub-band is always allocated 8 bits per sample whereas perhaps the 15th sub-band is always allocated four bits per sample. This fixed allocation is made on the basis of the known characteristics of speech signals. The bit allocation is illustrated in the drawing as box 4, but in fact it merely consists of discarding the appropriate number of less significant bits from the samples. As described so far, this arrangement is entirely conventional. Note that this coder was introduced above as a speech coder, because of the speech-specific fixed bit allocation: as will be seen later, more sophisticated adaptive bit allocation strategies can be employed to obtain improved compression of speech, as well as accommodating other types of audio signal. Also, the simplicity of this coder is such that it does not inherently require a framing structure; however an incoming speech frame of 1152 samples is assumed, which at a 16 kHz sampling rate implies a duration of 72 ms.

The samples output from the bit allocation 4 are grouped into two streams, the first consisting of the samples from the lower sixteen sub-bands BO . . . B15 and the second of the upper sixteen, B16 . . . B31. Obviously the actual number of bits per frame in each stream depends on the actual numbers of bits allocated.

Figure 2:
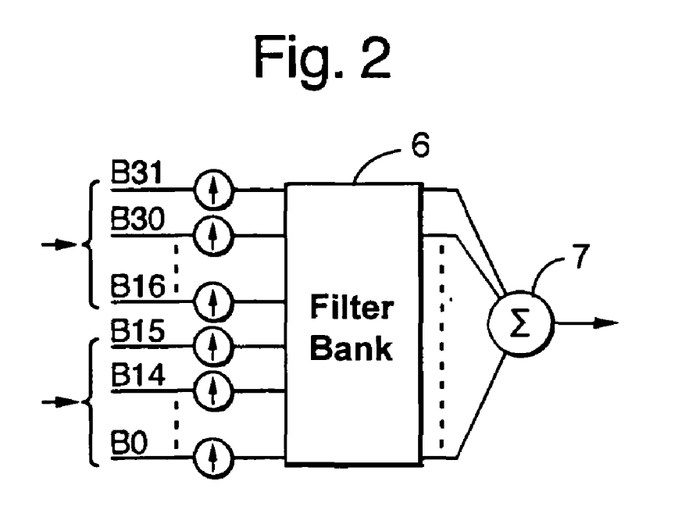
FIG. 2 is a block diagram of a sub-band speech decoder for use with the coder of FIG. 1.

FIG. 2 shows a corresponding decoder (of conventional construction) in which the sub-bands BO . . . B31 are upsampled at 5 back to 16 kHz and fed to a filter bank 6, the outputs of which are added together in an adder 7.

If both streams are fed to the decoder, then a speech signal of 0–8 kHz bandwidth can be recovered. It will be apparent that the second stream contains information only about the part of the signal lying in the frequency range 4 to 8 kHz. If, therefore, the second stream is discarded, the first stream alone may still be decoded to produce a useful speech signal, albeit band-limited to 0–4 kHz. Thus the coder may be regarded as layered, in that it receives an input audio signal and has a first output which delivers a coded version of the signal, and a second output carrying enhancement information which may be decoded along with the first output to produce a higher quality decoded signal. In this description, the first stream alone will be referred to as the first layer, and the two streams together will be referred to as the second layer.

Figure 3:
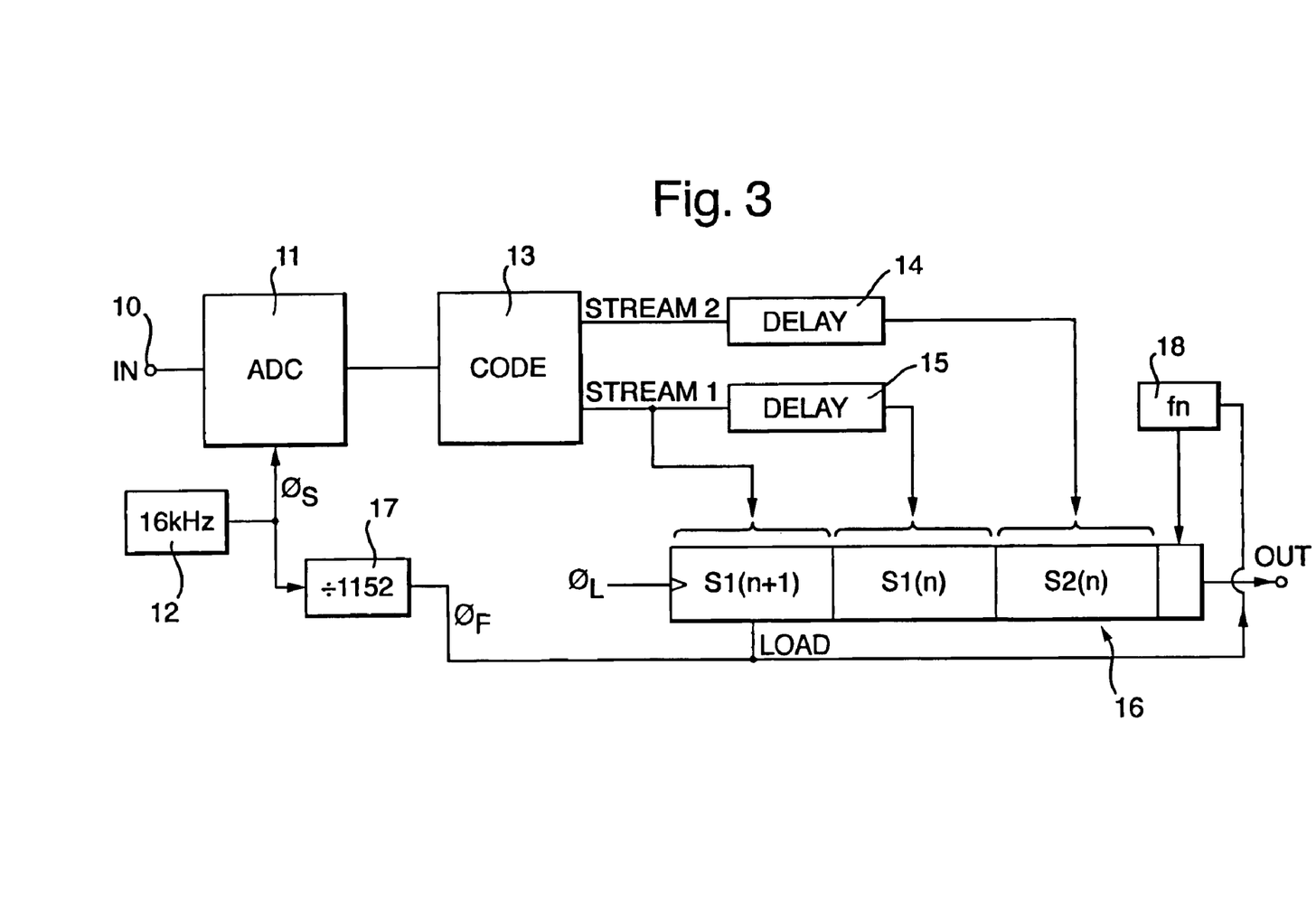
FIG. 3 is a block diagram of a transmitter in accordance with the first embodiment of the invention.

FIG. 3 shows an apparatus for transmission of speech signals. An input 10 receives analogue speech signals which are converted into digital form, at a sampling rate of 16 kHz, by an analogue-to-digital converter 11 under control of 16 kHz clock pulses $\phi_S$ from a clock generator 12, and fed to a sub-band coder 13 already described with reference to FIG. 1. The sub-band coder 13 has two outputs carrying the first stream of coded bits ("Stream 1") and the second stream ("Stream 2") respectively. These are delayed by one frame period (72 ms) by delays 14, 15 and loaded every 72 ms into a parallel-in, serial-out shift register 16 under control of a 13.89 Hz frame clock $\phi_F$ from a "÷1152" circuit 17, for assembly of a packet for transmission. At the same time the Stream 1 bits for the following frame are conducted from the coder 13 without passing through the delay 15 and also loaded into the register 16. This means that every transmitted packet (except, of course, the first) is preceded by a packet which also contains a duplicate of the Stream1 information. If desired, by appropriate rearrangement of the delays, this duplicate could be carried in the following packet, or indeed in an earlier or later packet spaced from the packet in question by two or more packets. A frame counter 18 counts cyclically from 0 to 255, clocked by $\phi_F$, to produce a frame number fn which is also loaded into the shift register. The contents of the shift register are clocked out serially under a line clock $\phi_L$ at any desired rate to an output 19. Obviously the clock rate must be high enough that that the entire packet stored in the register is clocked out in 72 ms or less (there is of course no upper limit). In practice the transmitted packet must contain a framing code and may need to contain addressing information, these however being conventional. The first and second streams of frame n are referred to below as $S1(n)$ and $S2(n)$ respectively.

Figure 4:
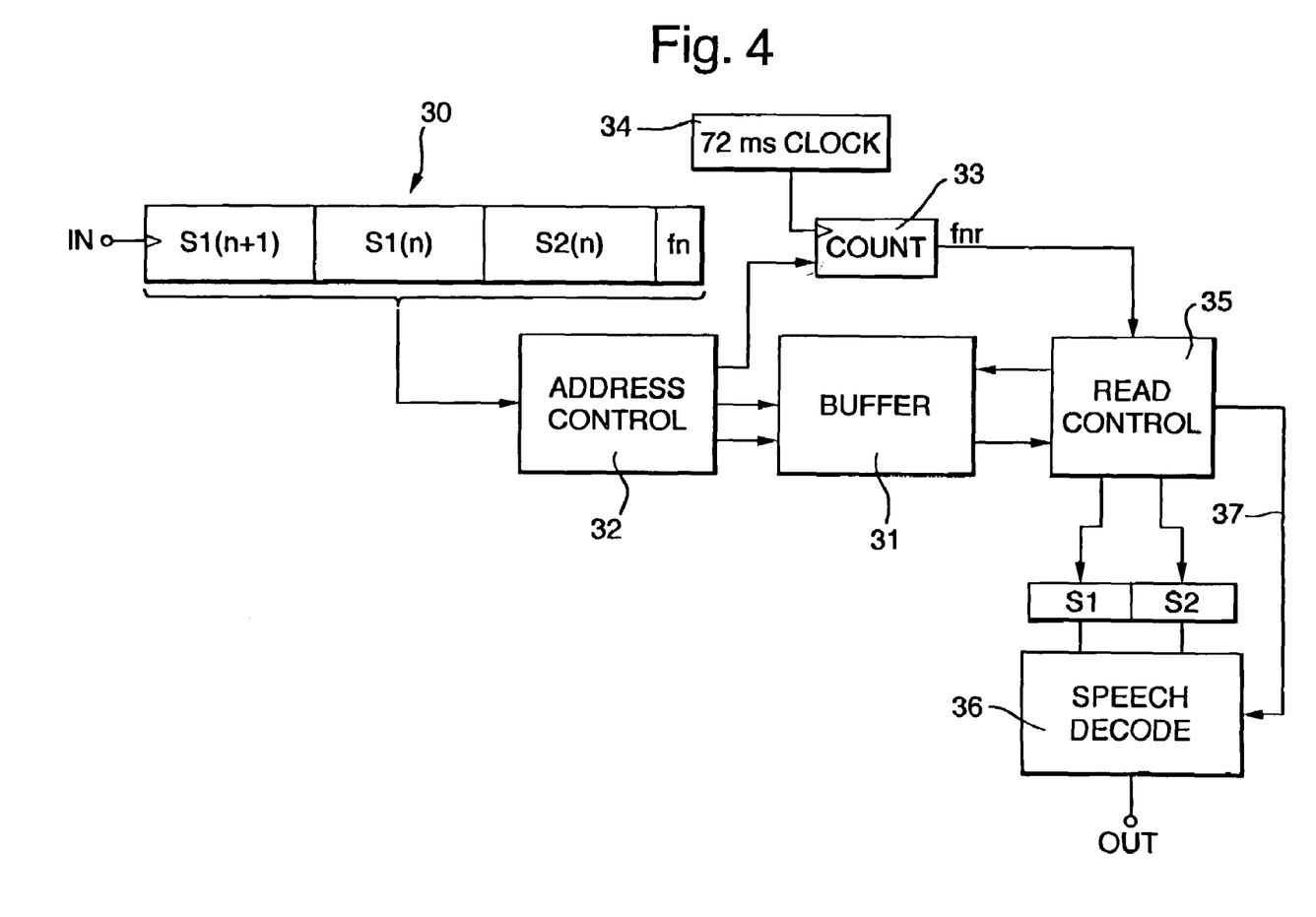
FIG. 4 is a block diagram of a receiver for use with the transmitter of FIG. 3.

FIG. 4 shows a receiver for receiving transmissions from the transmitter of FIG. 3, where a received packet is (after recovery of line clock and framing information, by means not shown) entered into a serial-in, parallel-out shift register 30. To accommodate variations in transmission delay, the received streams are to be stored in a cyclic buffer 31 which has a "build-out" delay. A write control unit 32 receives the contents of the register 30 and serves to write the packet into the buffer 31. The packets are arranged in the buffer in the order determined by the sequence number. If an expected packet is not received then a gap is left so that it may be inserted in the correct sequence should it arrive later but within the build-out period.

Readout of data from the buffer is performed with the aid of a frame counter 33 similar to the frame counter 18 at the transmitter, incremented every 72 ms by a local clock 34. It lags the incoming frames by the build-out period (typically from 1 to 10 frames, e.g. 6, depending on the connection characteristics and the extent to which delay is tolerable) by virtue of being loaded, at the commencement of a period of reception, with the received frame number fn, minus 6 (or other build-out value). If, due to drift between the 72 ms clock and the transmitter clock $\phi F$, buffer overflow or underflow occurs, then the system is reset by reloading the counter. Normally, a read control unit 35 accesses the counter 33 to obtain the current count value fnr and reads out from the buffer the $S1(n)$ and $S2(n)$ data from the packet having that frame number, and passes them to a speech decoder 36 as already described with reference to FIG. 2. If no packets are lost, and no packet is delayed relative to the previously transmitted packets by more than 6×72=432 ms, then this will ensure a continuous supply of data to the decoder 363.

If such loss or excessive delay occurs then the desired packet having a frame number fn equal to the counter content fnr will not be present in the buffer. In this case the read control unit 34 reads from the buffer the $S1(n)$ data from the packet having frame number (fnr−1), that is to say, the duplicate Stream 1 information for frame fnr which was carried in the immediately preceding packet, and forwards this to the decoder. In this way the decoder continues to operate normally, except that it receives no Stream 2 data for that frame, so that there will be a temporary reduction in bandwidth for one frame period. The read control unit 35 signals this fact to the decoder 36 via a connection 37, and the decoder disables the upper sixteen subbands.

In a modified version, this reduction may be alleviated by repetition of the previous frame data for stream 2—i.e. the read control unit reads out $S1(n)$ and $S2(n-1)$ from packet (fnr−1).

Note that it is not essential that the coder 13 be a sub-band coder, or that its second stream represents information about higher frequency components than does the first. In principle any other layered coder could be used, for example a PCM (pulse code modulation) coder in which the first stream consist of coarsely quantised samples and the second stream consists of additional, less significant, bits of the same samples, which of course would serve to reduce the level of quantisation noise that would be produced by a decoder receiving only the first stream. Note also however that the possibility of substitution from a previous frame for a missing upper stream exists only if the previous frame data have a sufficient correlation with the lost second stream data; this is the case with the sub-band system described above but not in the PCM example.

It should also be observed that, although in FIG. 3 the duplicate Stream 1 for a particular frame is carried in the packet preceding the packet which carries the full information for that frame, this is not essential, for example it could be carried in the following one; i.e. packet n could carry $S1(n)$, $S2(n)$ and $S1(n-1)$. This means that for, similar performance, the receiver build-out delay should be one greater than previously. This increases the signal delay at the receiver by 72 ms but on the other hand the signal delay at the transmitter is 72 ms less.

Moreover, the duplicate Stream 1 for a particular frame does not necessarily have to be carried in a packet which is consecutive with the packet which carries the full information for that frame. The delay offset can be chose to suit the characteristics of a particular transmission channel or network; for example a delay of two or more frames might be appropriate in a radio system which is prone to burst errors.

Figure 5:
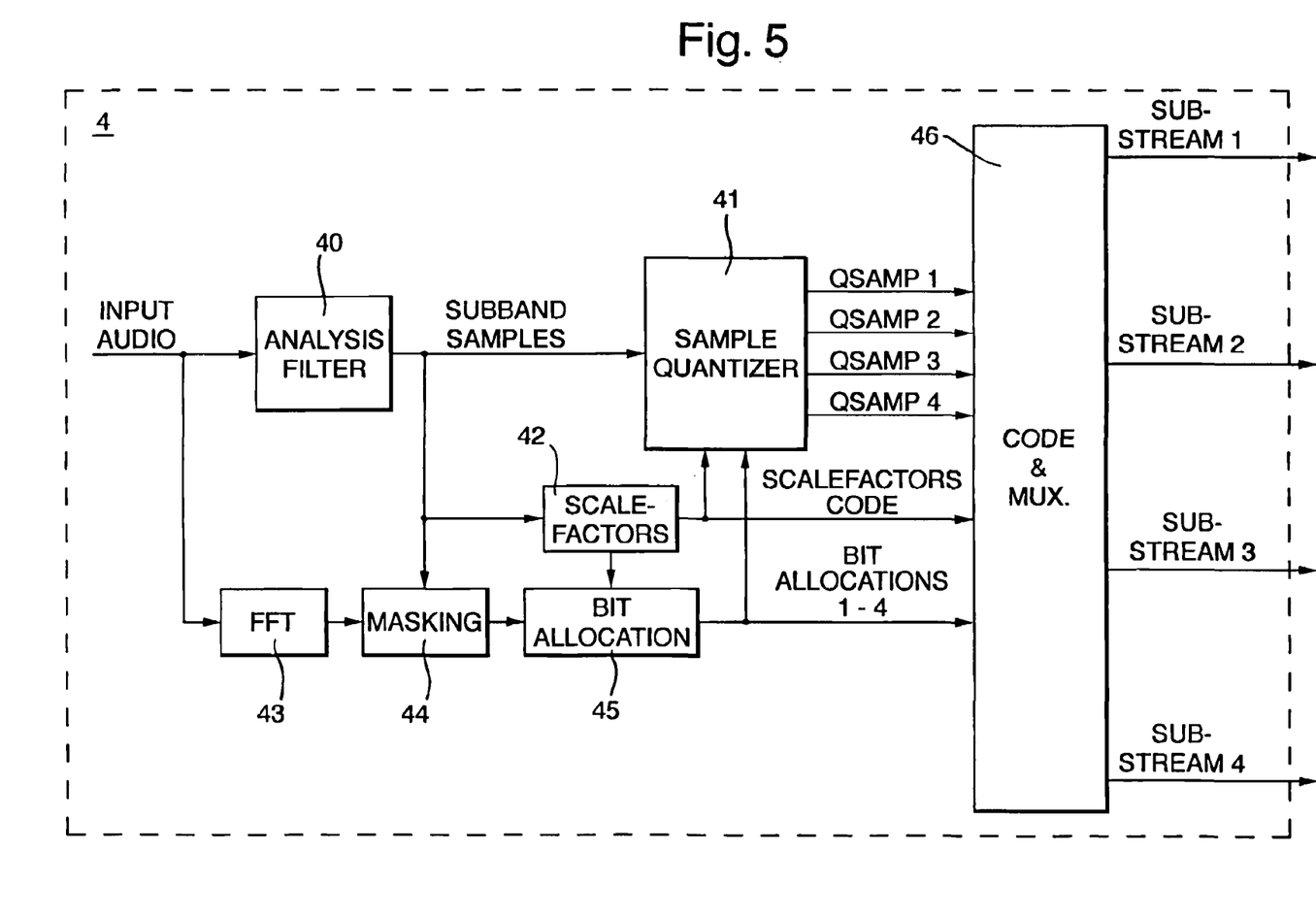
FIG. 5 is a block diagram of a sub-band speech coder used in a second embodiment of the invention.

FIG. 5 shows a more sophisticated sub-band coder than that shown in FIG. 1. This is based on, and similar to, the coder defined in the Moving Pictures Expert Group (MPEG) standard ISO 13813-3. Only those aspects of the coder which differ from the standard will be described in detail. The MPEG standard envisages operation at a number of different input audio sampling rates; the following description assumes a sampling rate of 16 kbit/s but may of course be scaled to other sampling rates if desired. A polyphase analysis filter 40 receives frames of 1152 input samples, producing an analysis frame of 32 sub-bands of 36 samples each. These samples are quantised by a quantiser 41 using variable scale factors controlled by scale factor calculation 42. The scale factors are calculated as described in the MPEG standard, and could be coded in the same way, though for simplicity we prefer to code the scale factors at a constant 12 bits per sub-band (for each frame) rather than using the variable length scale factors representation envisaged by the standard. (If a fixed length is used, then the connection from box 42 to box 45 in FIG. 5 is unnecessary).

The samples are quantised according to bit allocations determined for each frame from an adaptive bit allocation procedure, to use the phenomenon of simultaneous masking to minimise the audible effects of sample quantisation. Simultaneous masking occurs when a low-level signal component is made inaudible by a simultaneously occurring stronger component at some nearby frequency. A unit 43 applies a fast Fourier transform (FFT) to the signal, and supplies the result to a masking unit 44, where the masking properties of each audio frame are estimated (as described in the MPEG standard) using a psychoacoustic model and represented by a masking function mask(k) for the k'th sub-band (k=0 . . . 31). This masking function gives an estimate of signal level for sub-band k below which signals become inaudible or above which noise becomes audible. It is used to determine a signal-to-mask ratio smr for each of the 32 sub-bands:

$$smr(k) = sig(k) - mask(k)$$

where sig(k) is the signal energy within sub-band k. All these quantities are expressed in dB.

The actual bit allocation is performed by a bit allocation unit 45 which receives the smr(k) values from the masking unit 44. This performs the allocation by means of an iterative process in which available bit capacity is allocated in steps, allocating further capacity to whichever sub-band has, on the basis of the allocation of bit capacity made to it so far, the lowest mask-to-noise ratio mnr. Rather than expressing the allocation as a number of bits allocated, however, the standard—and the apparatus of FIG. 5—uses an integer bit-allocation code which is translated by a corresponding bit allocation table; allocating further capacity involves simply incrementing the code.

The signal-to-noise ratio smr(k) (needed for the bit allocation calculation) can be estimated with reasonable accuracy simply by multiplying the number of bits allocated by 6 dB, or using an appropriate look-up table. Alternatively the signal-to-noise ratio may be calculated taking into account the actual signal in sub-band k as well as the number of bits allocated for representing it.

In the standard, bit allocation needs to be performed only once per frame. In the coder of FIG. 5, however, the higher streams, in addition to contributing further sub-bands not present in the lower stream, also carry further bits for the sub-bands already represented. Thus the bit allocation procedure must (for this example of four streams) be performed

TABLE 1

| Bit allocation code AllocCode$_j$(k) | 0 | 1 | 2 | 3 | 4 | 5 | 6 | 7 |
|---|---|---|---|---|---|---|---|---|
| Quantisation levels QLevel$_j$(k) | 0 | 5 | 10 | 20 | 40 | 80 | 160 | 320 |
| Bits/sample Bits$_j$(k) | 0 | 2.3 | 3.3 | 4.3 | 5.3 | 6.3 | 7.3 | 8.3 |
| Bits (differential) B | — | 2.3 | 1 | 1 | 1 | 1 | 1 | 1 |

The following variables need to be defined:

K the number of sub-bands (32 in this example);

BitTot$_j$ the number of bits available for layer j (i.e. stream j and any lower streams, taken together) (values for this example are given in Table 2);

BitsAvailable the number of bits currently available for allocation to the current stream;

SFLen the length (in bits) of the scale factors (12 in this example);

AllocBNum$_j$(k) the length (in bits) of the bit allocation code used in stream j for sub-band k;

AllocMaxj(k) ($=2^{AllocBNum(k)}_j - 1$) the maximum allowed value of the allocation code for stream j in sub-band k;

AllocLim$_j$ the maximum number of sub-bands used in layer j, sub-band k;

AllocCode(k) the current value of the allocation code for sub-band k of a layer;

AllocCodej(k) the allocation code result for layer j, sub-band k;

Qlevelj(k) The number of quantisation levels to be used for stream j, sub-band k;

Bits$_j$(k) The number of bits require to code Qlevel$_j$(k) levels.

TABLE 2

|  | Layer 1 | Layer 2 | Layer 3 | Layer 4 |
|---|---|---|---|---|
| Bit-rate (kbit/s) | 8 | 16 | 32 | 64 |
| Bits/frame | 576 | 1152 | 2304 | 4608 |
| No. of subbands AllocLim$_j$ | 5 | 10 | 20 | 30 |
| Bit allocation codelength (bits) AllocBnum$_j$(k) | 2,2,2,2,2,0, . . . , 0 | 3,3,3,3,2,2,2,2,2,2,0, . . . ,0 | 3,3,3,3,3,3,3,3,3,3,2,2,2, 2,2,2,2,2,2,2,0, . . . ,0 | 3,3,3,3,3,3,3,3,3,3,2,2,2,2, 2,2,2,2,2,2,2,2,2,2,2,2,2,2,0,0 |
| Bit allocation codesize (levels) AllocMax$_j$(k) | 3,3,3,3,3,0, . . . , 0 | 7,7,7,3,3,3,3,3,3,0, . . . ,0 | 7,7,7,7,7,7,7,7,7,7,3,3,3, 3,3,3,3,3,3,3,0, . . . ,0 | 7,7,7,7,7,7,7,7,7,7,3,3,3,3, 3,3,3,3,3,3,3,3,3,3,3,3,3,3,0,0 |
| Bandwidth (kHz) | 1.25 | 2.5 | 5 | 7.5 | four times, in the manner now to be described, so that (for example) the first sub-band might be quantised to 20 levels for stream 1, so that stream 1 carries 4.3 bits for this sub-band, but quantised to 80 levels for the next layer, so that stream 2 carries two further bits for this sub-band. Note also that the result of this procedure is a set of codes each of which defines, in accordance with a look-up table (the contents of which are shown in Table 1 below) contained in the bit allocation unit 45, the sample quantisation for each sub-stream. It follows that the actual number of bits carried by any stream is the difference between the number of bits shown for that stream and the number of bits shown for the stream below.

The procedure is as follows: Calculate smr(k) for all k (k=0 . . . K−1) in the manner specified in the standard.

1. Set AllocCode(k) and snr(k) to zero for all k.
2. Initialise mnr(k)=snr(k)−smr(k) for all k.
3, Setj=1
4. If j=1 then set $$BitsAvailable = BitTot_j - \sum_{k=0}^{K-1} AllocBNum_j(k);$$

otherwise set $$BitsAvailable = BitTot_j - BitTot_{j-1} - \sum_{k=0}^{K-1} AllocBNum_j(k)$$

(i.e. the available capacity is reduced by the overhead required for transmission of the bit allocation codes themselves).

5. Initialise FullFlag(k) for all k such that if AllocCode(k)<AllocMaxj(k) then FullFlag(k)=0 else FullFlag(k)=1. Setting FullFlag(k)=0 will allow bits to be allocated to sub-band k for current stream j, and FullFlag(k)=1 will prevent such allocation.
6. If FullFlag(k)=1 for all k then go to step 19
7. Identify the value km of k that corresponds to the smallest value of mnr (i.e. such that mnr(km)<mnr(k) for k≠km. (Note that values of k for which FullFlag(k)=1 are ignored)
8. Look up the number of bits B corresponding to the proposed increment of the allocation code (AllocCode (km)) in Table 1.
9. Set BitsRemaining=BitsAvailable−B*36
10. If AllocCode(km)=0 then set BitsRemaining=BitsRemaining−SFLen (the first time an allocation is made for a sub-band, allowance must be made for the fact that a quantiser scale factor needs to be transmitted).
11. If BitsRemaining<0 then set FullFlag(km)=1 and go to step 7 else continue (if there are insufficient bits available to increment the allocation for subband km then FullFlag(km) is set to prevent further allocation to this sub-band).
12. Increment AllocCode(km) by 1.
13. Set BitsAvailable=BitsRemaining.
14. Determine new snr(km) (by measurement or estimation).
15. Calculate mnr(km) for new allocation by mnr(km)=snr(km)−smr(km).
16. If AllocCode(km)=AllocMax$_j$(km) then set FullFlag (km) to 1 to prevent further allocation.
17. Go to step 7.
18. Set AllocCode$_j$(k)=AllocCode(k) for all k (This is the set of bit allocations for stream j).
19. Increment j for the next stream and repeat from step 5 until all streams have been dealt with. Note particularly that AllocCode(k) is not reset.

The sub-band samples are quantised by the quantiser 41, which outputs the requisite number of bits into each stream. Thus, for stream 1, it produces Bits$_1$(k) for the kth sub-band, whilst for the higher streams it produces Bits$_j$(k)−Bits$_{j-1}$(k) bits/sample. These bits are coded and multiplexed by a unit 46, along with the scale factors and bit allocation codes. Where, as here for stream 1, non-integer numbers of bits/sample are used, the quantizer naturally outputs an integer number of bits/frame. For an allocation code of 1 (5 levels) it outputs qcod$_5$ (3 bits) representing a number in the range 0 to 4; for allocation code 2 (10 levels) it outputs qcod$_5$ plus an additional bit qbit$_{10}$, whilst for allocation code 3 (20 levels), it outputs these plus a further bit qbit$_{20}$ and so on. The 36 values qcod$_5$ (n), (n=0 . . . 35) for a frame are combined in groups of 3 to give 12 values: grp$_5$(i)=qcod$_5$ (3*i)+5*qcod$_5$(3*i+1)+25*qcod$_5$ (3*i+2)

where (i=0 . . . 11) and the operator*indicates multiplication. These values have a range of 0 to 124 and are coded using 7 bits.

The 4-layer sample quantization process starts by using the layer 4 bit allocation code to define the quantizer resolution. The resulting quantized sample code is then encoded according to the series of four bit allocation codes. First, the layer 4 and layer 3 allocation codes are compared. If the layer 3 allocation is 0 then the quantized samples are encoded wholly for the layer 4 stream using the 5-level grouped plus n-bit enhancement scheme described above. If the layer 3 allocation is not 0, then the difference in allocation codes is used to determine the number of enhancement bits to be encoded for the layer 4 stream. This process is then repeated for layers 3 and 2 to produce the corresponding encoded streams. For layer 1, a non-zero allocation must start with a 5-level grouped encoding.

This process produces a set of four separate quantization streams. These can be built up in a coder to produce the four required encoded sample sequences, where each encoded sample sequence decodes to give a specific layer of subband samples.

The multiplexer 46 constructs four output streams from the bit allocation, scale factor and quantized sample parameters. The resulting sub-stream allocations are shown in Table 3 with the figures for scale factors based on the assumption that bits are allocated to all the available sub-bands. If the sub-band sample quantization cannot use all the allocated bits, then the multiplexer performs packing with zero bit values.

TABLE 3

| | Sub-stream | | | |
|---|---|---|---|---|
| | 1 | 2 | 3 | 4 |
| Bit allocation (bits/frame) | 10 | 24 | 50 | 71 |
| Scalefactors (bits/frame) | 60 | 60 | 120 | 120 |
| Subband samples (bits/frame) | 506 | 492 | 982 | 2113 |
| Total Bit/frame | 576 | 576 | 1152 | 2304 |
| Bit Rate (kbit/s) | 8 | 8 | 16 | 32 |

The unit 46 encodes a new set of bit allocation codes for each layer. Stream 1 contains all the layer 1 bit allocation codes for subbands 0 to 4, and stream 2 contains the layer 2 bit allocation codes for sub-bands 0 to 9. In decoding layer 2 from streams 1 and 2, no use is made of the layer 1 bit allocation codes, which can be considered as a 10 bits/frame overhead (see FIG. 9). Similarly, bit allocations for layers 1, 2 and 3 totalling 84 bits/frame are an overhead for layer 4 decoding. Inter-stream differential coding of the bit allocations could be used to reduce the overheads for layers 2, 3 and 4, and might, therefore, allow an extra 1 or 2 bits/frame to be applied for layer 4 subband sample encoding.

Figure 6:
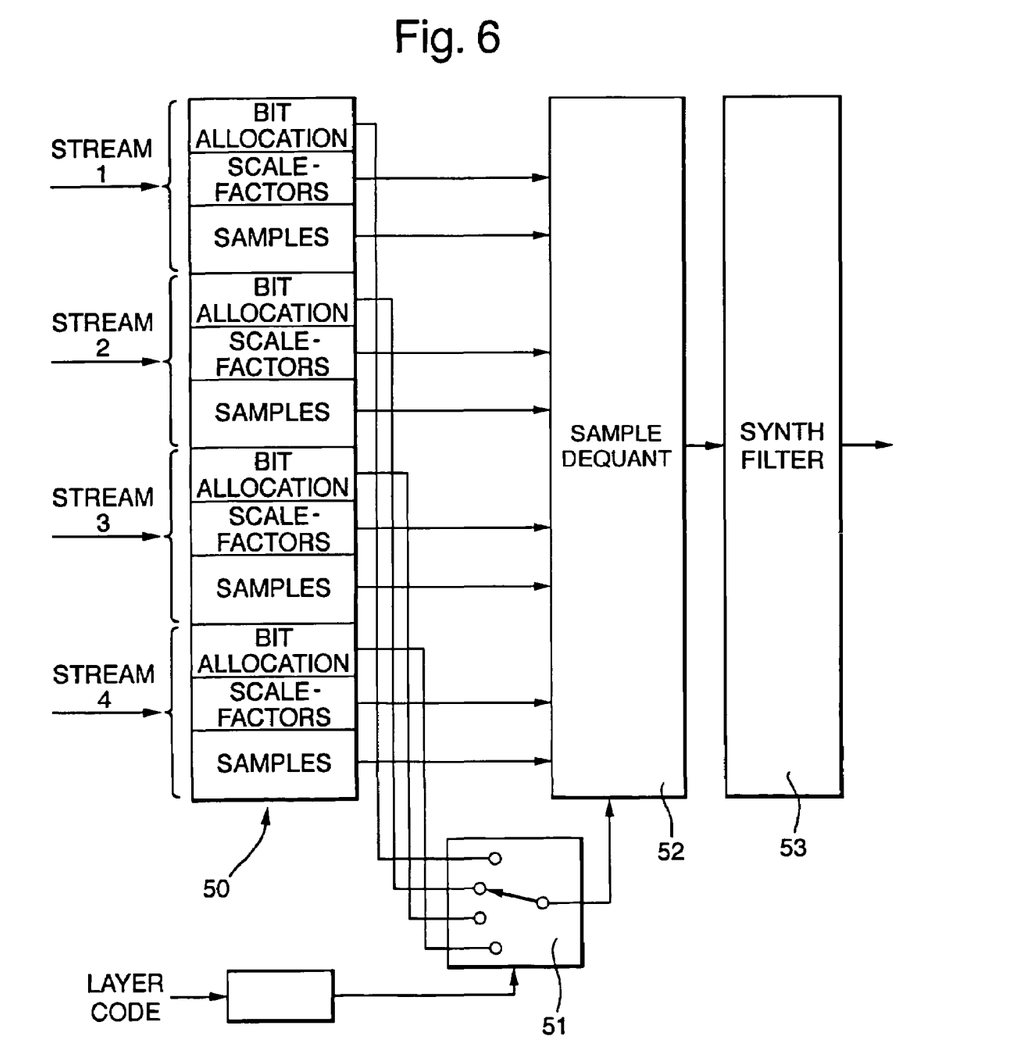
FIG. 6 is a block diagram of a sub-band speech decoder for use with the coder of FIG. 5.

A decoder for use with the encoder of FIG. 5 is shown in FIG. 6. A register 50 receives (after transmission or recording) stream 1 from the encoder of FIG. 5. It also has inputs for receiving streams 2, 3, 4 if these are available; along with a layer code indicating how many streams are in fact being received. The layer code selects via a switch 51 the appropriate set of bit allocation codes and this controls a sample dequantizer 52 to operate, for each subband, in accordance with the number of quantisation levels indicated by the corresponding bit allocation code of the selected set.

The samples output by the dequantizer 52 then pass through a synthesis filter 53 operating in a conventional manner.

Figure 7:
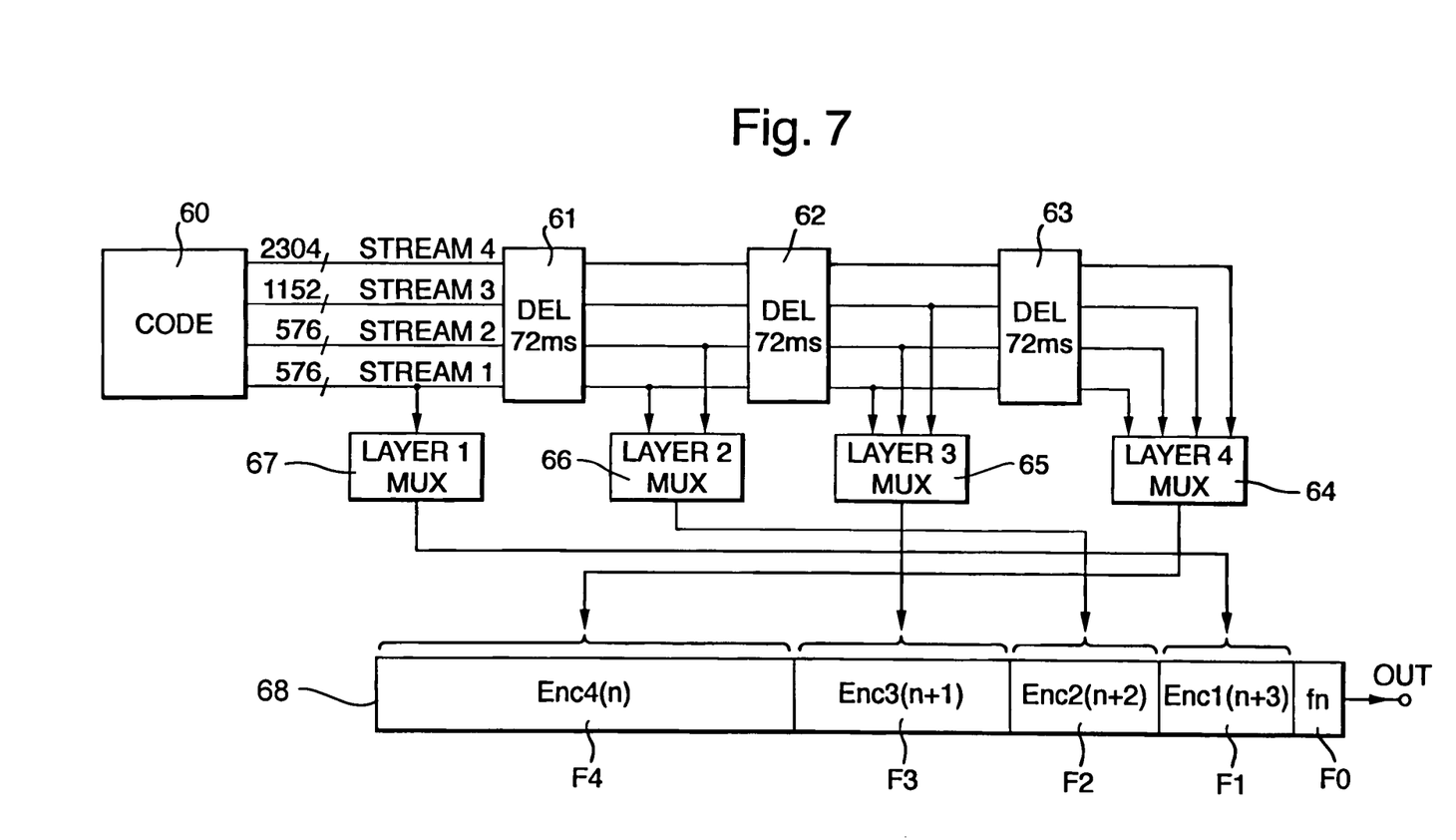
FIG. 7 is a block diagram of a transmitter in accordance with the second embodiment of the invention.

FIG. 7 shows a transmitter, in many respects similar to that of FIG. 3, but using the coder of FIG. 5, shown at 60 receiving digital audio input signals.

The four output streams S1, S2, S3, S4 output from the coder have 576, 576, 1152 and 2304 bits per frame respectively. They are delayed in three 72 ms stages by delays 61, 62, 63. All four streams from the output of the delay 63 are combined in a multiplexer 64 to produce a 4608-bit/frame Layer 4 signal Enc4($n$) to be loaded into a shift register 65 analogous to the shift register 16 of FIG. 3. Streams S1 to S3 from the output of the delay 62 are combined in a multiplexer 66 to produce a 2304-bit Layer 3 signal Enc3($n$+1) to be loaded into the shift register 65; note the index n+1 since there is one less delay and therefore the data pertain to the following frame. Similarly streams S1, S2 from the delay 61 are combined at 66 to give Enc2($n$+2) of 1152 bits and Stream S1, undelayed yields Enc1($n$+3) of 576 bits. All these, along with an eight-bit frame number fn as described above are assembled in the register 65 (totalling 4608+2304+1152+576+8=8648 bits, plus any desired supervisory information), and clocked out at line rate as described earlier. For future reference, the fields of the packet assembled in the shift register are labelled F0 to F4. Although these arrangements are shown as being constructed in dedicated discrete hardware, they could of course be implemented by one or more suitably programmed digital signal processing devices.

The corresponding receiver has the same structure as that shown in FIG. 4, and operated in the same fashion as described previously, except that the contents of the register 30 now correspond to those of the register 50 of FIG. 7, and the operation of the read control unit 34 is more complex. Normally the read control unit 34 reads from the buffer 31 the Enc4($n$) data from the packet carrying the frame number fnr. In the event of the frame fnr being absent from the buffer, the read control unit 34 reads from the buffer the Enc3($n$) data from the packet having frame number (fnr−1). If however this packet is also missing then it reads from the buffer the Enc2($n$) data from the packet having frame number (fnr−2), whilst in the event of three packets missing for consecutive audio frames, then it reads out the Enc1($n$) data from the packet having frame number (fnr−3). As before, this results in a reduction in bandwidth of the signal output from the decoder 35 which can be alleviated by substitution of a stream from a previous audio viz.:

| Packet missing for frame | Read | From field | From packet carrying frame number |
|---|---|---|---|
| None | Enc4(n) | F4 | fnr |
| fnr | Enc3(n) | F3 | fnr-1 |
|  | S4 of Enc4(n-1)* | F4 | fnr-1 |
| fnr and fnr-1 | Enc2(n) | F2 | fnr-2 |
|  | S3 of Enc3(n-1)* | F3 | fnr-2 |
|  | S4 of Enc4(n-2)* | F4 | fnr-2 |
| fnr and fnr-1 and fnr-2 | Enc1(n) | F1 | fnr-3 |
|  | S2 of Enc2(n-1)* | F2 | fnr-3 |
|  | S3 of Enc3(n-2)* | F3 | fnr-3 |
|  | S4 of Enc4(n-3)* | F4 | fnr-3 |

Note that the higher streams S2, S3, S4 each contain, compared with the next lower stream, (a) information about further sub-bands and (b) additional bits to reduce the quantisation error in the sub-bands for which data are already present in the lower stream. The substitutions with data about earlier frames (marked "*" in the above table) are appropriate only for (a), the additional bits (b) not being useful as their values have little correlation with the missing ones. The decoder as shown in FIG. 6 will make such substitutions, and this will work, merely introducing a small additional amount of noise. In order to avoid this, it can be arranged that the read control unit 35, when substituting previous audio frame information for one or more of the upper streams, signal this fact to the decoder. The selector 51 must then be modified so that, for subbands carried only by substituted streams, it takes the bit allocation information from stream 4, but, for subbands where information is contained in a non-substituted stream, it takes the bit allocation information from the highest non-substituted stream.

What is claimed is:

1. An apparatus for transmission of signals comprising:
   (a) a coder operable to generate a first output providing first data from which a decoder can produce a reconstructed signal and a second output providing second, enhancement, data whereby a decoder receiving both the first and second data can produce a higher quality reconstructed signal; and
   (b) means operable to assemble packets of data for transmission, each packet containing: primary data which includes the first data in respect of a temporal portion of the signal and the second data in respect of the same portion of the signal; and secondary data which includes the first data in respect of a different temporal portion of the signal but lacks the second data in respect of that portion.

2. An apparatus according to claim 1 in which said different temporal portion is a portion later than that represented by the primary data.

3. An apparatus according to claim 2 in which said different temporal portion is the portion directly following the portion represented by the primary data.

4. An apparatus according to claim 1 in which said different temporal portion is a portion earlier than that represented by the primary data.

5. An apparatus according to claim 1 in which the assembly means is arranged to include in each packet a sequence code to indicate the temporal sequence of the primary data contained in the packets.

6. An apparatus according to claim 1 in which the coder is operable to produce a plurality of outputs providing enhancement data, successive sets of enhancement data representing successive improvements to the reconstructed signal quality, and in which the primary data includes all such outputs and the secondary data includes first data in respect of a like plurality of different temporal portions of the signal and progressively smaller numbers of sets of second data in respect of those portions.

7. An apparatus according to claim 1 in which the signals are audio signals and the coder is an audio signal coder.

8. An apparatus according to claim 7 in which the coder is a sub-band coder, in which the first data include data in respect of lower frequency ones of the coder sub-bands, and the second, enhancement data include data in respect of higher frequency sub-bands.

9. An apparatus according to claim 1 in which the first data include binary representations of digital values and the second data include additional bits representing a finer resolution of the said digital values.

10. An apparatus according to claim 8 in which the sub-band audio coder comprises:
   (a) filter means to receive a sampled audio signal and to divide the signal into a plurality of sub-band signals each corresponding to a respective frequency sub-band;
   (b) a quantiser for quantising the sub-band signals;

(c) bit allocation means for adaptively determining the number of quantisation levels to be used by the quantiser in dependence on the signal characteristics;

and wherein the quantiser has a first output for providing said first data, said first data comprising quantised values for one or more of said sub-bands, and a second output for providing said second data, said second data comprising, for at least one of the sub-bands in respect of which quantised values are provided at the first output, additional, enhancement, bits representing a less coarse quantisation of the values for that sub-band or sub-bands, and wherein the bit allocation means is operable to perform a first allocation operation in which a first predetermined quota of bits for the first output is allocated among the sub-bands followed by a second allocation operation in which a second predetermined quota of bits, for the additional bits at the second output, is allocated among the sub-bands.

11. An apparatus according to claim 10 in which the second output also provides quantised values for at least one sub-band in respect of which quantised values are not provided at the first output.

12. An apparatus according to claim 10 in which the quantiser has at least one further output, in which the second and further output(s) in each case provide values for sub-bands not represented in any lower-order output and/or provide additional bits for sub-bands which are represented in a lower order output, and in which the bit allocation means is operable to perform a number of allocation operations equal in number to the number of outputs, each serving to allocate, for that output, a respective quota of bits among the sub-bands.

13. An apparatus for reception of signals comprising:
(a) means for receiving packets of data, each packet containing primary data which includes first data in respect of a temporal portion of the signal and second, enhancement, data in respect of the same portion of the signal; and
  secondary data which includes the first data in respect of a different temporal portion of the signal but lacks the second data in respect of that portion;
(b) a buffer for storing the received packets;
(c) a decoder capable of producing a reconstructed signal from the first data alone and capable of a producing a higher quality reconstructed signal from the first and second data together;
(d) control means operable to read from the buffer the primary data in respect of successive temporal portions of the signal and to forward them to the decoder; and, in the event that the primary data in respect of a temporal portion of speech be absent from the buffer, to read instead the secondary data in respect of that temporal portion and forward it to the decoder.

14. An apparatus according to claim 13 in which the control means is operable, in said event that the secondary data in respect of a temporal portion of speech be absent from the buffer, to read the second, enhancement, data in respect of a different temporal portion of the speech signal and forward it to the decoder.

15. An apparatus according to claim 13 in which each packet contains a sequence code to indicate the temporal sequence of the primary data contained in it, and the control means is operable to determine the temporal sequence of the packets by reference to the sequence code, irrespective of the actual order of receipt of the packets.

16. An apparatus according to claim 13 in which the signals are audio signals and the decoder is an audio signal decoder.

17. An apparatus for transmission of signals comprising:
(a) a coder operable to generate a first output providing first data from which a decoder can produce a reconstructed signal and a second output providing second, enhancement, data whereby a decoder receiving both the first and second data can produce a higher quality reconstructed signal; and
(b) means operable to assemble packets of data for transmission, each packet containing: primary data which includes the first data in respect of a temporal portion of the signal and the second data in respect of the same portion of the signal; and said secondary data which includes a duplicate copy of the first data in respect of a different temporal portion of the signal but lacks the second data in respect of that portion.

18. An apparatus for reception of signals comprising:
(a) means for receiving packets of data, each packet containing primary data which includes first data in respect of a temporal portion of the signal and second, enhancement, data in respect of the same portion of the signal; and
  secondary data which includes a duplicate copy of the first data in respect of a different temporal portion of the signal but lacks the second data in respect of that portion;
(b) a buffer for storing the received packets;
(c) a decoder capable of producing a reconstructed signal from the first data alone and capable of a producing a higher quality reconstructed signal from the first and second data together;
(d) control means operable to read from the buffer the primary data in respect of successive temporal portions of the signal and to forward them to the decoder; and, in the event that the primary data in respect of a temporal portion of speech be absent from the buffer, to read instead the secondary data in respect of that temporal portion and forward it to the decoder.

19. A method as in claim 18, wherein said secondary data includes a duplicate copy of the first data.

20. A method of transmitting signals, the method comprising:
(a) generating a first output providing first data from which a decoder can produce a reconstructed signal and a second output providing second, enhancement, data whereby a decoder receiving both the first and second data can produce a higher quality reconstructed signal; and
(b) assembling packets of data for transmission, each packet containing: primary data which includes the first data in respect of a temporal portion of the signal and the second data in respect of the same portion of the signal; and secondary data which includes the first data in respect of a different temporal portion of the signal but lacks the second data in respect of that portion.

21. A method as in claim 20, wherein said secondary data includes a duplicate copy of the first data.

22. A method of receiving signals, the method comprising:
(a) receiving packets of data, each packet containing primary data which includes first data in respect of a temporal portion of the signal and second, enhancement, data in respect of the same portion of the signal; and secondary data which includes the first data in respect of a different temporal portion of the signal but lacks the second data in respect of that portion;

(b) storing the received packets in a buffer;

(c) producing, via a decoder, a reconstructed signal from the first data alone, the decoder being capable of a producing a higher quality reconstructed signal from the first and second data together;

(d) reading from the buffer the primary data in respect of successive temporal portions of the signal and forwarding them to the decoder; and, in the event that the primary data in respect of a temporal portion of speech be absent from the buffer, to read instead the secondary data in respect of that temporal portion and forwarding it to the decoder.

23. A method of processing signals, the method comprising:

(a) generating a first output providing first data from which a decoder can produce a reconstructed signal and a second output providing second, enhancement, data whereby a decoder receiving both the first and second data can produce a higher quality reconstructed signal; and (b) assembling packets of data, each packet containing primary data which includes the first data in respect of a temporal portion of the signal and the second data in respect of the same portion of the signal; and secondary data which includes the first data in respect of a different temporal portion of the signal but lacks the second data in respect of that portion.

* * * * *